(12) United States Patent
Omura et al.

(10) Patent No.: US 6,583,221 B1
(45) Date of Patent: Jun. 24, 2003

(54) VINYL CHLORIDE RESIN, PROCESS FOR PRODUCING THE SAME, AND MOLDED OBJECT

(75) Inventors: Takahiro Omura, Tokuyama (JP); Noriki Fujii, Shinnanyo (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/807,840

(22) PCT Filed: Feb. 26, 1999

(86) PCT No.: PCT/JP99/00900

§ 371 (c)(1), (2), (4) Date: Jul. 13, 2001

(87) PCT Pub. No.: WO00/23488

PCT Pub. Date: Apr. 27, 2000

(30) Foreign Application Priority Data

Oct. 19, 1998 (JP) ............................................. 10/296816

(51) Int. Cl.⁷ ..................... C08F 285/00; C08F 214/06; C08L 51/04
(52) U.S. Cl. ............................ 525/64; 525/71; 525/78; 525/80; 525/84
(58) Field of Search ............................. 525/64, 71, 78, 525/80, 84, 902

(56) References Cited

FOREIGN PATENT DOCUMENTS

| JP | 09110945 | * | 4/1997 |
| JP | 09291124 | * | 11/1997 |
| JP | 11140140 | * | 5/1999 |
| JP | 2001098131 A | * | 4/2001 |

* cited by examiner

Primary Examiner—James J. Seidleck
Assistant Examiner—Olga Asinovsky
(74) Attorney, Agent, or Firm—Connolly Bove Lodge & Hutz LLP

(57) ABSTRACT

This invention is related to a vinyl chloride resin as obtainable by graft-copolymerizing an acrylic copolymer (a) having a mean particle diameter of 60 to 250 nm with a vinyl monomer (b) predominantly composed of vinyl chloride, said acrylic copolymer (a) being obtainable by graft-copolymerizing 40 to 90 weight % of a copolymer (a-1) with 10 to 60 weight % of a mixture monomer (a-2), said copolymer (a-1) being composed of 100 weight parts of a radical-polymerizable monomer which gives a homopolymer having a glass transition point of not lower than −140° C. but lower than −60° C. and 0.1 to 1 weight part of a polyfunctional monomer, and said mixture monomer (a-2) comprising 100 weight parts of a radical-polymerizable monomer predominantly comprised of a (meth) acrylate which gives a homopolymer having a glass transition point of not lower than −55° C. but lower than −10° C. and 1.5 to 10 weight parts of a polyfunctional monomer.

9 Claims, 2 Drawing Sheets

VINYL CHLORIDE RESIN, PROCESS FOR PRODUCING THE SAME, AND MOLDED OBJECT

TECHNICAL FIELD

The present invention relates to a vinyl chloride resin, a method of producing it, and molded products of the same.

BACKGROUND ART

Vinyl chloride resin is outstanding in mechanical strength, weathering resistance and chemical resistance and has been used in many applications. However, for use in certain applications such as architectural materials including sidings, window frames and sashes or rigid products including pipes and joints, the species of vinyl chloride resin heretofore in use are deficient in impact resistance, for instance, and, therefore, several techniques for overcoming the drawback have so far been proposed.

Japanese Kokai Publication Sho-60-255813 discloses a technology of producing a vinyl chloride resin with improved impact resistance, weathering resistance and elastic modulus in flexure which comprises graft-copolymerizing vinyl chloride with an acrylic copolymer comprising an acrylic monomer which gives a homopolymer having a glass transition point of not over $-10°$ C. and a polyfunctional monomer.

Japanese Kokai Publication Hei-8-225622 discloses a vinyl chloride resin comprising a particulate acrylic copolymer latex and having a core-shell structure as graft-copolymerized with vinyl chloride.

Japanese Kokai Publication Hei-9-110945 discloses a vinyl chloride resin obtainable by graft-copolymerizing a copolymer composed of a radical-polymerizable monomer which gives a homopolymer having a glass transition point of not higher than $-60°$ C. and a polyfunctional monomer with a monomeric mixture comprising an acrylic monomer which gives a homopolymer having a glass transition point of not below $-55°$ C. and a polyfunctional monomer and further graft-copolymerizing the resulting graft-copolymer with vinyl chloride.

These techniques have invariably contributed to improved impact resistance of vinyl chloride resin but the product resins are invariably low in glass transition temperature and contain an acrylic latex which is a tacky rubber component liable to adhere and accumulate on the metal mold in an extrusion process to give rise to thin spots and streaks on the product surface, thus detracting seriously from the aesthetic quality of the product. Particularly in counter extrusion, the problem of poor product appearance is frequently encountered. Therefore, there is an industrial need for vinyl chloride resin which is conducive to steady production of moldings of good surface condition even over many hours of continuous production.

SUMMARY OF THE INVENTION

The object of the present invention is to overcome the above disadvantages of the prior art and provide a vinyl chloride resin conducive to the production of moldings having a high impact resistance and a satisfactory surface condition over many hours of continuous production with good reproducibility, a method of producing such a vinyl chloride resin, and a molded product as obtainable therefrom.

The first aspect of the present invention is concerned with a vinyl chloride resin as obtainable by graft-copolymerizing an acrylic copolymer (a) having a mean particle diameter of 60 to 250 nm with a vinyl monomer (b) predominantly composed of vinyl chloride, said acrylic copolymer (a) being obtainable by graft-copolymerizing 40 to 90 weight % of a copolymer (a–1) with 10 to 60 weight % of a mixture monomer (a–2), said copolymer (a–1) being composed of 100 weight parts of a radical-polymerizable monomer which gives a homopolymer having a glass transition point of not lower than $-140°$ C. but lower than $-60°$ C. and 0.1 to 1 weight part of a polyfunctional monomer, and said mixture monomer (a–2) comprising 100 weight parts of a radical-polymerizable monomer predominantly comprised of a (meth)acrylate which gives a homopolymer having a glass transition point of not lower than $-55°$ C. but lower than $-10°$ C. and 1.5 to 10 weight parts of a polyfunctional monomer.

The second aspect of the present invention is concerned with a vinyl chloride resin comprising a matrix resin predominantly composed of polyvinyl chloride and, as dispersed therein, a particulate acrylic copolymer (a) having a glass transition point of not lower than $-140°$ C. but lower than $-20°$ C., a gel fraction of 50 to 100 weight % and a mean particle diameter of 60 to 250 nm, the graft ratio of vinyl chloride to said acrylic copolymer (a) being 0.1 to 5 weight %.

The third aspect of the present invention is directed to a method of producing a vinyl chloride resin comprising reacting 100 weight parts of a radical-polymerizable monomer with 0.1 to 1 weight part of a polyfunctional monomer to give a copolymer (a–1), where said radical-polymerizable monomer gives a homopolymer having a glass transition point of not lower than $-140°$ C. but lower than $-60°$ C., graft-copolymerizing 40 to 90 weight % of said copolymer (a–1) with 10 to 60 weight % of a mixture monomer (a–2) to give an acrylic copolymer (a) having a mean particle diameter of 60 to 250 nm, where said mixture monomer (a–2) comprises 100 weight parts of a radical-polymerizable monomer predominantly comprised of a (meth) acrylate which gives a homopolymer having a glass transition point of not lower than $-55°$ C. but lower than $-10°$ C. and 1.5 to 10 weight parts of a polyfunctional monomer and graft-copolymerizing said acrylic copolymer (a) with a vinyl monomer (b) predominantly comprised of vinyl chloride.

The fourth aspect of the present invention is concerned with a rigid vinyl chloride resin molded product which comprises a matrix resin predominantly composed of polyvinyl chloride and, as dispersed therein, a particulate acrylic copolymer (a) having a glass transition point of not lower than $-140°$ C. but lower than $-20°$ C., a gel fraction of 50 to 100 weight %, and a mean particle diameter of 60 to 250 nm, the graft ratio of vinyl chloride to said acrylic copolymer (a) being 0.1 to 5 weight %.

The fifth aspect of the present invention is concerned with a pipe, as an example of the rigid vinyl chloride resin molded product according to said fourth aspect, which has a Charpy impact strength value of not less than 100 kgf·cm/cm$^2$ and a tensile strength value of not less than 460 kgf/cm$^2$.

The sixth aspect of the present invention is concerned with a deformed extrusion, as an example of the rigid vinyl chloride resin molded product according to said fourth aspect, which has a Charpy impact strength value of not less than 10 kgf·cm/cm² and a tensile strength value of not less than 400 kgf/cm².

The seventh aspect of the present invention is concerned with a pipe of the vinyl chloride resin according to said first aspect or second aspect of the invention, which has a Charpy impact strength value of not less than 100 kgf·cm/cm² and a tensile strength value of not less than 460 kgf/cm².

The eighth aspect of the present invention is concerned with a deformed extrusion of the vinyl chloride resin according to said first aspect or second aspect of the invention, which has a Charpy impact strength value of not less than 10 kgf·cm/cm² and a tensile strength value of not less than 400 kgf/cm².

The ninth aspect of the present invention is concerned with a plastic sash comprising the rigid vinyl chloride resin molded product according to said sixth aspect of the invention or said eighth aspect of the invention or the deformed extrusion according to said eighth aspect of the invention.

DETAILED DESCRIPTION OF INVENTION

Figure 1:
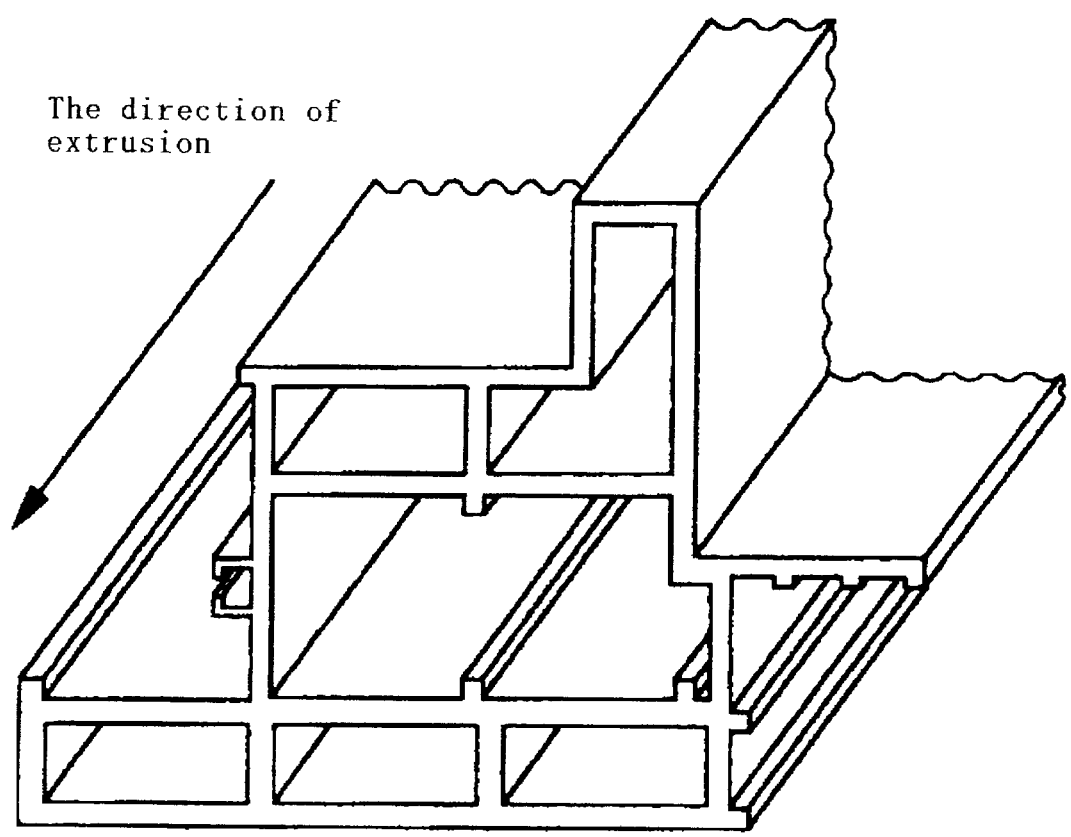
FIG. 1 is a perspective view showing an exemplary deformed extrusion for the fabrication of a plastic sash according to the present invention.

The present invention is now described in detail.

The vinyl chloride resin according to the first aspect of the invention is a graft-copolymer comprising an acrylic copolymer (a) and a vinyl monomer (b), said acrylic copolymer (a) being obtainable by graft-copolymerizing a copolymer (a–1) with a monomer mixture (a–2).

The copolymer (a–1) is composed of 100 weight parts of a radical-polymerizable monomer which gives a homopolymer having a glass transition point of not lower than –140° C. but lower than –60° C. and 0.1 to 1 weight part of a polyfunctional monomer.

The radical-polymerizable monomer which gives a homopolymer having a glass transition point of not lower than –140° C. but lower than –60° C. constitutes the core of a particle of said acrylic copolymer (a) and is used for the purpose of enhancing the impact resistance of the product vinyl chloride resin.

The radical-polymerizable monomer mentioned above gives a homopolymer having a glass transition point of not lower than –140° C. but lower than –60° C. If said point is lower than –140° C., the monomer will not be practically acceptable in consideration of the glass transition points of polymers which are in general industrial use. If it exceeds –60° C., no sufficient flexibility may be obtained for taking care of the high-velocity strain in the molding of vinyl chloride resin. Therefore, the above temperature is limited to said range.

The radical-polymerizable monomer which gives a homopolymer having a glass transition point of not lower than –140° C. but lower than –60° C. is not particularly restricted but includes, for example, dienes such as butadiene, isoprene, 2-ethylbutadiene, 2-propylbutadiene, etc.; alkenes such as ethylene, 1-octene, 2-methylpropylene, etc.; alkyl acrylates such as n-heptyl acrylate, n-octyl acrylate, 2-methylheptyl acrylate, 2-ethylhexyl acrylate, n-nonyl acrylate, 2-methyloctyl acrylate, 2-ethylheptyl acrylate, n-decyl acrylate, 2-methylnonyl acrylate, 2-ethyloctyl acrylate, etc.; and vinyl ethers such as n-pentyl vinyl ether, n-hexyl vinyl ether, n-octyl vinyl ether, n-heptyl vinyl ether, 2-ethylhexyl vinyl ether and so on. These may be used singly or in a combination of two or more species.

The term "glass transition point" as used in this specification for describing said radical-polymerizable monomer which gives a homopolymer having a glass transition point of not lower than –140° C. but lower than –60° C., among others, is based on the definition given in "Polymer Data Handbook (Fundamentals), the Society of Polymer Science, Japan (ed.), Baifukan, among other publications.

The polyfunctional monomer mentioned above is used for the purpose of crosslinking the core polymer of said copolymer (a–1) to improve the impact resistance of vinyl chloride resin.

The polyfunctional monomer as such is not particularly restricted but includes, among others, di (meth) acrylates such as ethylene glycol di(meth)acrylate, diethylene glycol di(meth)acrylate, triethylene glycol di(meth)acrylate, 1,6-hexanediol di(meth)acrylate, trimethylolpropane di(meth)acrylate, etc.; tri(meth)acrylates such as trimethylolpropane tri(meth)acrylate, ethylene oxide-modified trimethylolpropane tri(meth)acrylate, pentaerythritol tri(meth)acrylate, etc.; pentaerythritol tetra(meth)acrylate, dipentaerythritol hexa(meth)acrylate, di- or triallyl compounds such as diallyl phthalate, diallyl maleate, diallyl fumarate, diallyl succinate, triallyl isocyanurate, etc.; and divinyl compounds such as divinylbenzene, butadiene, and so on. These may be used singly or in a combination of two or more species.

The copolymer (a–1) contains said polyfunctional monomer in a proportion of 0.1 to 1 weight part relative to 100 weight parts of said radical-polymerizable monomer which gives a homopolymer having a glass transition point of not lower than –140° C. but lower than –60° C. When the proportion of said polyfunctional monomer is smaller than 0.1 weight part, the grain morphology of the acrylic copolymer (a) tends to be disrupted in the molding of the vinyl chloride resin so that the expression of impact resistance will be interfered with. If it exceeds 1 weight part, the crosslinking density of copolymer (a–1) is increased too much to insure an adequate impact resistance. The preferred range is 0.2 to 0.5 weight part.

The above copolymer (a–1) can be produced by polymerizing said radical-polymerizable monomer which gives a homopolymer having a glass transition point of not lower than –140° C. but lower than –60° C. with said polyfunctional monomer. The technology for this polymerization is not particularly restricted but includes an emulsion polymerization technique and a suspension polymerization technique, among others.

The monomer mixture (a–2) mentioned above comprises 100 weight parts of a radical-polymerizable monomer predominantly comprised of a (meth) acrylate which gives a homopolymer having a glass transition point of not lower than –55° C. but lower than –10° C. and 1.5 to 10 weight parts of a polyfunctional monomer.

In the context of the present invention, the radical-polymerizable monomer predominantly comprised of a (meth)acrylate which gives a homopolymer having a glass transition temperature of not lower than –55° C. but lower than –10° C. is a mixture comprising not less than 50 weight % of a (meth)acrylate which gives a homopolymer having a glass transition point of not lower than −55° C. but lower than −10° C. and a radical-polymerizable monomer which gives a homopolymer having a glass transition point of not lower than −55° C. but lower than −10° C. and is copolymerizable with (meth)acrylate.

The (meth)acrylate which gives a homopolymer having a glass transition point of not lower than −55° C. but lower than −10° C. is used as a main constituent of the shell of acrylic copolymer (a) which will be described in detail hereinafter for the purpose of improving the impact resistance of the product vinyl chloride resin and, at the same time, covering the polymer core with the low glass trasition temperature to reduce the tackiness of particles of the acrylic copolymer (a).

As mentioned above, the (meth) acrylate mentioned above gives a homopolymer having a glass transition point of not lower than −55° C. but lower than −10° C. If the point is lower than −55° C., the monomer is not sufficiently effective in covering the copolymer (a−1) to reduce the tackiness of acrylic copolymer (a) On the other hand, if the point is not lower than −10° C., the required flexibility of vinyl chloride resin may hardly be insured.

The (meth)acrylate which gives a homopolymer having a glass transition point of not lower than −55° C. but lower than −10° C. is not particularly restricted but includes various alkyl (meth)acrylates such as ethyl acrylate, n-propyl acrylate, isopropyl acrylate, n-butyl (meth) acrylate, isobutyl acrylate, sec-butyl acrylate, n-pentyl acrylate, n-hexyl acrylate, cumyl acrylate, n-heptyl methacrylate, n-octyl methacrylate, 2-methylheptyl methacrylate, 2-ethylhexyl methacrylate, n-nonyl methacrylate, 2-methyloctyl methacrylate, 2-ethylheptyl methacrylate, n-decyl methacrylate, 2-methylnonyl methacrylate, 2-ethyloctyl methacrylate, lauryl (meth) acrylate, etc.; and polar group-containing acrylates such as 2-hydroxyethyl acrylate, 2-hydroxypropyl acrylate and so on. These may be used singly or in a combination of two or more species.

The above radical polymerizable monomer which gives a homopolymer having a glass transition point of not lower than −55° C. but lower than −10° C. and is copolymerizable with (meth)acrylate is used for the purpose of improving the mechanical strength, chemical resistance and mold ability of the product vinyl chloride resin.

The above radical-polymerizable monomer which gives a homopolymer having a glass transition point of not lower than −55° C. but lower than −10° C. and is copolymerizable with (meth)acrylate is not particularly restricted but includes alkyl (meth)acrylates such as methyl (meth)acrylate, ethyl methacrylate, n-propyl methacrylate, isopropyl methacrylate, isobutyl methacrylate, sec-butyl methacrylate, t-butyl (meth) acrylate, cumyl methacrylate, cyclohexyl (meth) acrylate, myristyl (meth)acrylate, palmityl (meth) acrylate, stearyl (meth)acrylate, etc.; polar group-containing vinyl monomers such as 2-hydroxyethyl methacrylate, 2-hydroxypropyl methacrylate, 2-acryloyloxyethyl phthalate, etc.; aromatic vinyl monomers such as styrene, α-methylstyrene, p-methylstyrene, p-chlorostyrene, etc.; unsaturated nitriles such as acrylonitrile, methacrylonitrile, etc.; and vinyl esters such as vinyl acetate, vinyl propionate, etc., among others. These may be used singly or in a combination of two or more species.

The polyfunctional monomer mentioned above is used for the purpose of crosslinking the shell polymer to reduce the tackiness of said copolymer (a−1) and, at the same time, assisting in the graft-copolymerization reaction between said copolymer (a−1) and said vinyl monomer (b) predominantly comprised of vinyl chloride to thereby improve the impact resistance.

The polyfunctional monomer is not particularly restricted but includes the species mentioned above in the description about the copolymer (a−1), among others.

In the above monomer mixture (a−2), said polyfunctional monomer is contained in a proportion of 1.5~10 weight parts relative to 100 weight parts of the radical-polymerizable monomer predominantly comprised of a (meth) acrylate which gives a homopolymer having a glass transition point of not lower than −55° C. but lower than −10° C. If the proportion is smaller than 1.5 weight parts, the effect of preventing the adhesion of the copolymer (a−1) may not be obtained. If it exceeds 10 weight parts, the excessive crosslink density will result in insufficient impact resistance. Preferred is 3 to 7 weight parts.

The above acrylic copolymer (a) can be obtained by graft-copolymerizing said copolymer (a−1) with said monomer mixture (a−2).

In said acrylic copolymer (a), the relative amounts of said copolymer (a−1) and said monomer mixture (a−2) are 40 to 90 weight % of said copolymer (a−1) and 10 to 60 weight % of said monomer mixture (a−2). If the proportion of the monomer mixture (a−2) is smaller than 10 weight %, the tackiness of the resulting acrylic copolymer (a) will be increased. If it exceeds 60 weight % and the core is small, no sufficient impact resistance may be obtained.

The technology which can be used for the above graft-copolymerization includes but is not limited to an emulsion polymerization method and a suspension polymerization method. In terms of the expression of impact resistance and the ease of controlling the particle size of the acrylic copolymer (a), the emulsion polymerization method is preferred.

While said emulsion polymerization method may be classified, according to the mode of adding monomers, into three techniques, namely the bolus polymerization technique, the monomer dripping technique, and the emulsion dripping technique, any of these techniques can be employed in the practice of the first aspect of the invention. In this connection, when a multi-lamellar particle is to be produced, the monomer dripping technique or the emulsion dripping technique is preferred.

The respective polymerization techniques are described below.

The bolus polymerization technique comprises charging an autoclave equipped with a jacket means with pure water, an emulsifier-dispersant, a polymerization initiator and a monomer(s) all at one time, evacuating the autoclave to drive off oxygen, adding nitrogen gas to reinstate the atmospheric pressure, stirring the charge under nitrogen sufficiently for emulsification, setting the internal temperature of the autoclave equipped with the jacket means to a predetermined level using the jacket means, and adding the polymerization initiator for polymerization.

The monomer dripping technique mentioned above comprises charging an autoclave equipped with a jacket means with pure water, an emulsifier-dispersant and a polymerization initiator, evacuating the autoclave to drive off oxygen, adding nitrogen gas to reinstate the atmospheric pressure, setting the internal temperature of the autoclave with the jacket to a predetermined temperature and dripping the monomer(s) in small predetermined portions to effect gradual polymerization.

The emulsion dripping technique mentioned above comprises emulsifying a monomer(s), an emulsifier-dispersant and pure water well with stirring to prepare a monomer emulsion in advance, charging an autoclave equipped with a jacket means with pure water and a polymerization initiator, decompressing the autoclave to drive off oxygen, adding nitrogen gas to reinstate the atmospheric pressure, setting the internal temperature of the autoclave with the jacket in the first place to a predetermined temperature and then dripping said monomer emulsion in small predetermined portions to effect polymerization. In this technique, by adding a portion (seed monomer) of said monomer emulsion in one dose at the initiation of polymerization and, then, adding the remainder dropwise, the particle diameter of the product polymer can be easily controlled according to the amount of the seed monomer.

The acrylic copolymer (a) can be obtained, for example, by the following procedure.

First, said radical-polymerizable monomer which gives a homopolymer having a glass transition point of not lower than −140° C. but lower than −60° C. and said polyfunctional monomer are copolymerized in the presence of an emulsifier-dispersant and a polymerization initiator by the emulsion polymerization to give said core copolymer (a−1). Then, in the presence of this copolymer (a−1), an emulsifier-dispersant and a polymerization initiator, said monomer mixture (a−2) comprising a radial-polymerizable monomer predominantly comprised of a (meth) acrylate which gives a homopolymer having a glass transition point of not lower than −55° C. but lower than −10° C. and a polyfunctional monomer is added for graft-copolymerization by the emulsion polymerization method to form a shell segment and thereby give the objective acrylic copolymer (a).

Formation of said shell segment may be carried out in a continuous series of polymerization or carried out by adding the monomer mixture (a−2) after the synthesis and recovery of the core segment.

The emulsifier-dispersant mentioned above is added for the purpose of improving the dispersion stability of said monomers in the emulsion to thereby allow the polymerization to proceed with efficiency. The emulsifier-dispersant is not particularly restricted but includes anionic surfactants such as polyoxyethylene alkyl phenyl ether sulfate; nonionic surfactants, partially saponified polyvinyl acetate, cellulosic dispersants, gelatin and so on. Among these, anionic surfactants are particularly preferred.

The polymerization initiator is not particularly restricted but includes water-soluble polymerization initiators such as potassium persulfate, ammonium persulfate, hydrogen peroxide, etc.; organic peroxides such as benzoyl peroxide, lauroyl peroxide, etc.; azo initiators such as azobisisobutyronitrile etc.; and redox initiators, among others.

It is sufficient to add the polymerization initiator at one time when the polymerization of said copolymer (a−1) and the polymerization of said acrylic copolymer (a) are carried out in a continuous series. On the other hand, when the polymerization of said copolymer (a−1) and the polymerization of said acrylic copolymer (a) are carried but indiscrete stages, the polymerization initiator must be added in the respective reaction stages.

In conducting the above polymerization, a pH control agent, an antioxidant, etc. may be used where necessary. For the purpose of enhancing the mechanical stability of said emulsion of acrylic copolymer (a), a protective colloid may also be added, where necessary, at the end of the polymerization reaction.

The acrylic copolymer thus obtained has a bilamellar core-shell particulate structure.

The particles of said acrylic copolymer (a) should have a mean diameter of 60 to 250 nm. If the mean diameter is less than 60 nm, the proportion of fine particles not greater than 10 nm, which contribute to increased viscosity, will be increased so that the resin as a whole becomes so viscous that it tends to adhere to the surface of the metal mold to cause a poor product appearance. On the other hand, if the diameter exceeds 250 nm, the molded product will be decreased in impact resistance and tensile resistance. The preferred particle diameter is 100 to 200 nm.

The acrylic copolymer (a) preferably has a glass transition point of not lower than −140° C. but lower than −20° C. In view of the glass transition point of the radical-polymerizable monomer constituting the acrylic copolymer (a), those having a glass transition point of lower than −140° C. cannot be expected. On the other hand, at $Tg \geq -20°$ C., no sufficient impact resistance can be obtained.

The acrylic copolymer (a) preferably has a gel fraction of 50 to 100 weight %. If the gel fraction is less than 50 weight %, the crosslinking degree is so low that uncrosslinked acrylic molecules bleed out on the surface of the molded product to adversely affect the appearance of the molded product. The more preferred range is 75 to 100 weight %.

The resin solid fraction of said acrylic copolymer (a) is preferably 10 to 60 weight %. If it is less than 10 weight %, the productivity of acrylic copolymer (a) may not be satisfactory, and if it exceeds 60 weight %, the subsequent polymerization reaction with the vinyl monomer (b) predominantly comprised of vinyl chloride will not be stable enough.

The vinyl chloride resin according to the first aspect of the invention is prepared by graft-copolymerizing a vinyl monomer (b) predominantly comprised of vinyl chloride with said acrylic copolymer (a).

As used in this specification, the term vinyl monomer (b) predominantly comprised of vinyl chloride means a mixture of not less than 50 weight % of vinyl chloride and a vinyl monomer(s) copolymerizable with vinyl chloride.

The vinylmonomer copolymerizable with vinyl chloride may be any of the monomers conventionally employed and may for example be selected from among vinyl acetate, alkyl (meth) acrylates, alkyl vinyl ethers, ethylene, vinyl fluoride, maleimide and so on. These may be used singly or in a combination of two or more species.

The method of graft-copolymerizing a vinyl monomer (b) predominantly comprised of vinyl chloride with said acrylic copolymer (a) is not particularly restricted but includes suspension polymerization, emulsion polymerization, solution polymerization, and block polymerization, among others. Particularly preferred is suspension polymerization.

The vinyl chloride resin according to the first aspect of the invention can be produced, for example by the following method.

A reactor equipped with stirrer and jacket means is charged with pure water, an acrylic copolymer (a), a dispersant, an oil-soluble polymerization initiator, a water-soluble thickener, and optionally a polymerization degree modulator. Then, using a vacuum pump, the reactor is decompressed to drive the air off. Then, under stirring, the reactor is further charged with said vinyl monomer (b) predominantly comprised of vinyl chloride. The reactor is then heated via the jacket to carry out the graft-copolymerization of vinyl chloride. Since said graft-copolymerization is an exothermic reaction, the internal temperature, i.e. polymerization temperature, is controlled by adjusting the jacket temperature.

After completion of the reaction, the unreacted vinyl chloride is distilled off and the residue is slurried and dehydrated to dryness to give a vinyl chloride resin according to the first aspect of the invention.

The dispersant mentioned above is used for the purpose of improving the dispersion stability of the above acrylic copolymer (a) and letting the graft polymerization of vinyl chloride proceed with efficiency. The above dispersant is not particularly restricted but includes poly(meth)acrylates, (meth) acrylic acid-alkyl acrylate copolymers, methylcellulose, ethylcellulose, hydroxypropylmethylcellulose, polyethylene glycol, polyvinyl acetate and a partial saponification product thereof, gelatin, polyvinylpyrrolidone, starch, maleic anhydride-styrene copolymer and soon. These may be used singly or in a combination of two or more species.

The oil-soluble polymerization initiator mentioned above is not particularly restricted but is preferably a radical polymerization initiator because it is particularly useful for graft copolymerization. The above radical polymerization initiator is not particularly restricted but includes organic peroxides such as lauroyl peroxide, t-butyl peroxypivalate, diisopropyl peroxycarbonate, dioctyl peroxydicarbonate, t-butyl peroxyneodecanoate, α-cumyl peroxyneodecanoate, etc.; and azo compounds such as 2,2-azobisisobutyronitrile, 2,2-azobis-2,4-dimethylvaleronitrile and so on.

The water-soluble thickener mentioned above is not particularly restricted but includes poly(meth) acrylic acid, alkyl (meth)acrylate-(meth)acrylic acid copolymers, casein, and metal salts thereof, among others.

The polymerization degree modulator is not particularly restricted but includes chain transfer agents such as mercaptomethanol, mercaptoethanol, mercaptopropanol, etc.; and crosslinking agents such as divinylbenzene, ethylene glycol dimethacrylate, etc.; among others.

In the above polymerization reaction, a flocculating agent may be added to said acrylic copolymer (a) beforehand in order to reduce the amount of the adhesion of the acrylic copolymer (a) to the reactor inside.

In the polymerization reaction, in addition to the above components, a pH control agent and an antioxidant may also be added where necessary.

In the vinyl chloride resin according to the first aspect of the invention, the degree of polymerization of vinyl chloride is preferably 300 to 2000. No adequate moldability may be insured when the degree of polymerization falls lower than 300 or conversely when it exceeds 2000. More preferred range is 400 to 1600.

The vinyl chloride resin according to the first aspect of the invention is preferably such that particles of said acrylic copolymer (a) are dispersed in a matrix resin predominantly composed of polyvinyl chloride.

The proportion of said acrylic copolymer (a) in the vinyl chloride resin according to the first aspect of the invention is not particularly restricted but is preferably in the range of 1 to 30 weight %. If the proportion is smaller than 1 weight %, the impact resistance of the molded product will be inadequate. If it exceeds 30 weight %, the mechanical strength of the molded product will be insufficient. The preferred range is 3 to 16 weight %.

In the vinyl chloride resin according to the first aspect of the invention, the graft ratio of vinyl chloride is preferably in the range of 0.1 to 5 weight %. As used in this specification, the above term graft ratio of vinyl chloride means the weight fraction of vinyl chloride molecules chemically bound to the acrylic copolymer (a) by way of copolymerization. If the graft ratio of vinyl chloride is less than 0.1 weight %, the surface of the acrylic copolymer (a) may not be sufficiently covered up with vinyl chloride molecules so that the copolymer adheres to the mold surface in the molding stage and prevents production of molded products having a good surface condition. Exceeding 5 weight % is not acceptable for practical purposes.

The vinyl chloride resin according to the first aspect of the invention is subjected to molding after addition of a heat stabilizer, an auxiliary stabilizer, a lubricant, a processing aid, an antioxidant, a light stabilizer, a filler, a pigment and/or the like as needed.

The heat stabilizer mentioned above is not particularly restricted but includes organotin stabilizers such as dimethyltin mercaptide, dibutyltin mercaptide, dioctyltin mercaptide, dibutyltin maleate, dibutyltin maleate polymer, dioctyltin maleate, dioctyltin maleate polymer, dibutyltin laurate, dibutyltin laurate polymer, etc.; lead stabilizers such as lead stearate, dibasic lead phosphite, tribasic lead sulfate, etc.; calcium-zinc stabilizers; barium-zinc stabilizers; and barium-cadmium stabilizers; and so on.

The auxiliary stabilizer mentioned above is not particularly restricted but includes epoxidized soybean oil, epoxidized linseed oil, epoxidized tetrahydrophthalates, epoxidized polybutadiene and phosphoric esters, among others.

The lubricant mentioned above is not particularly restricted but includes montanic acid wax, paraffin wax, polyethylene wax, stearic acid, stearyl alcohol, butyl stearate and so on.

The processing aid mentioned above is not particularly restricted, either, but includes acrylic processing aids such as alkyl acrylate-alkyl methacrylate copolymers having weight average molecular weights between 100000 and 2000000. Such acrylic processing aids are not particularly restricted but include n-butyl acrylate-methyl methacrylate copolymer, 2-ethylhexyl acrylate-methyl methacrylate-butyl methacrylate copolymer and so on.

The antioxidant mentioned above is not particularly restricted but includes phenol antioxidants, among others.

The light stabilizer mentioned above is not particularly restricted but includes ultraviolet absorbers such as salicylic esters, benzophenones, benzotriazoles, cyanoacrylates, etc.; and hindered amine light stabilizers.

The filler mentioned above is not particularly restricted but includes calcium carbonate and talc, among others.

The pigment mentioned above is not particularly restricted but includes organic pigments such as those in the azo, phthalocyanine, threne, and dye lake series; and inorganic pigments such as those in the oxide, chromic acid-molybdate, sulfide-selenide, ferrocyanide and other series.

To the vinyl chloride resin according to the first aspect of the invention, a plasticizer may be added for the purpose of improving the molding processability.

The plasticizer mentioned above is not particularly restricted but includes dibutyl phthalate, di-2-ethylhexyl phthalate, di-2-ethylhexyl adipate and so on.

Furthermore, a thermoplastic resin, such as polyvinyl chloride, may be added to the vinyl chloride resin according to the first aspect of the invention in molding stage as necessary.

The method of mixing the above-mentioned various additives with the above vinyl chloride resin is not particularly restricted but may be a hot-blend method or a cold-blend method.

The molding technology for said vinyl chloride resin is not particularly restricted but includes extrusion molding, injection molding, calendering and press-forming, among others.

Because the core of acrylic copolymer (a) is a highly flexible polymer, the vinyl chloride resin according to the first aspect of the invention may retain an extremely high impact resistance.

Furthermore, the vinyl chloride resin according to the first aspect of the invention is distinct from the conventional vinyl chloride resin in that since the shell segment of acrylic copolymer (a) has been highly crosslinked, the surface hardness and elasticity of particles are high and that since the polyfunctional monomer functioning as a crosslinking agent is used in a large amount, the graft ratio of vinyl chloride is increased so that the tackiness of the acrylic copolymer (a) is decreased. As a result, the adhesion and build-up of resin particles on the metal mold surface in molding can be precluded, with the result that surface defects such as thin spots, streaks, irregularities, cracks, etc. are not induced even over many hours of continuous molding.

In addition, because the mean particle diameter of the acrylic copolymer (a) used in the vinyl chloride resin according to the first aspect of the invention is large, the incidence of particles not over 10 nm which would contribute to tackiness is precluded, so that the adhesion can be well controlled to obtain a molded product with a satisfactory surface condition.

The second aspect of the present invention is concerned with a vinyl chloride resin
which comprises a matrix resin predominantly composed of polyvinyl chloride and, as dispersed therein, a particulate acrylic copolymer (a) having a glass transition point of not lower than −140° C. but lower than −20° C., a gel fraction of 50 to 100 weight % and a mean particle diameter of 60 to 250 nm, the graft ratio of vinyl chloride to said acrylic copolymer (a) being 0.1 to 5 weight %.

The vinyl chloride resin according to the second aspect of the invention comprises a matrix resin predominantly composed of polyvinyl chloride and, as dispersed therein, a particulate acrylic copolymer (a) having a glass transition point of not lower than −140° C. but lower than −20° C., a gel fraction of 50 to 100 weight % and a mean particle diameter of 60 to 250 nm.

The particles of said acrylic copolymer (a) are not particularly restricted but maybe those described for the vinyl chloride resin according to the first aspect of the invention.

In the matrix resin predominantly composed of polyvinyl chloride, the graft ratio of vinyl chloride to the acrylic copolymer (a) is 0.1 to 5 weight %. If the ratio is less than 0.1 weight %, the surface of the acrylic copolymer (a) cannot be sufficiently covered up with vinyl chloride molecule so that the copolymer adheres to the metal mold surface in molding to fail to obtain molded products with an acceptable surface condition. On the other hand, exceeding 5 weight % is not acceptable for practical purposes.

The third aspect of the present invention is concerned with a method of producing a vinyl chloride resin which comprises reacting 100 weight parts of a radical-polymerizable monomer which gives a homopolymer having a glass transition point of not lower than −140° C. but lower than −60° C. with 0.1 to 1 weight part of a polyfunctional monomer to give a copolymer (a-1), graft-copolymerizing 40 to 90 weight % of said copolymer (a-1) with 10 to 60 weight % of a mixture monomer (a-2) comprising 100 weight parts of a radical-polymerizable monomer predominantly comprised of a (meth)acrylate which gives a homopolymer having a glass transition point of not lower than −55° C. but lower than −10° C. and 1.5 to 10 weight parts of a polyfunctional monomer to give an acrylic copolymer (a) having a mean particle diameter of 60 to 250 nm, and graft-copolymerizing said acrylic copolymer (a) with a vinyl monomer (b) predominantly comprised of vinyl chloride.

By the method of producing a vinyl chloride resin according to the third aspect of the invention, a bilamellar acrylic copolymer (a) comprising a flexible polymer core covered with a densely crosslinked shell can be produced with good efficiency. Moreover, in the graft-copolymerization between the acrylic copolymer (a) and the vinyl monomer (b) predominantly comprised of vinyl chloride, the graft ratio of vinyl chloride can be set high so that a vinyl chloride resin conducive to the production of moldings with high impact resistance and acceptable surface condition even over many hours of continuous molding can be obtained.

The fourth aspect of the invention is concerned with a rigid vinyl chloride molded product
which comprises a matrix resin predominantly composed of polyvinyl chloride and, as dispersed therein, a particulate acrylic copolymer (a) having a glass transition point of not lower than −140° C. but lower than −20° C., a gel fraction of 50 to 100 weight % and a mean particle diameter of 60 to 250 nm,
the graft ratio of vinyl chloride to said acrylic copolymer (a) being 0.1 to 5 weight %.

The rigid vinyl chloride resin molded product according to the fourth aspect of the invention comprises a matrix resin predominantly composed of polyvinyl chloride and, as dispersed therein, a particulate acrylic copolymer (a) having a glass transition point of not lower than −140° C. but lower than −20° C., a gel fraction of 50 to 100 weight % and a mean particle diameter of 60 to 250 nm.

The particles of said acrylic copolymer (a) are not particularly restricted but include those described for the vinyl chloride resin according to the first aspect of the invention.

The matrix resin predominantly composed of polyvinyl chloride is such that the graft ratio of vinyl chloride to said acrylic copolymer (a) is 0.1 to 5 weight %. When the ratio is less than 0.1 weight %, the surface of the acrylic copolymer (a) cannot be sufficiently covered up with vinyl chloride molecule so that the copolymer tends to adhere to the metal mold surface in molding to fail to obtain molded products with an acceptable surface condition. On the other hand, exceeding 5 weight % is not acceptable for practical purposes.

The rigid vinyl chloride resin molded product according to the fourth aspect of the invention can be obtained by supplementing the vinyl chloride resin according to said first aspect or second aspect with various additives as needed, such as a heat stabilizer, an auxiliary stabilizer, a lubricant, a processing aid, an antioxidant, a light stabilizer, a filler and a pigment and molding the resulting composition.

The molding technology is not particularly restricted but includes extrusion molding, injection molding, calendering, press-forming and other techniques.

The rigid vinyl chloride resin molded product is not particularly restricted in geometry but can be judiciously selected from tubular, planar and other shapes according to the intended application.

The preferred rigid vinyl chloride molded product according to the fourth aspect of the invention includes a pipe having a Charpy impact value of not less than 100 kgf·cm/cm$^2$ and a tensile strength value of not less than 460 kgf/cm$^2$ or a deformed extrusion having a Charpy impact strength value of not less than 10 kgf·cm/cm$^2$ and a tensile strength value of not less than 400 kgf/cm$^2$.

The pipe mentioned above has a Charpy impact strength value of not less than 100 kgf·cm/cm$^2$. When the impact value is less than 100kgf·cm/cm$^2$, the pipe cannot be fully serviceable in cold climates.

The pipe has a tensile strength value of not less than 460 kgf/cm$^2$. If the tensile strength is less than 460 kgf/cm$^2$, the pulsation resistance in town water service will be insufficient.

The above pipe constitutes an embodiment of the invention.

The deformed extrusion mentioned above has a Charpy impact strength value of not less than 10 kgf·cm/cm². If the impact value is less than 100 kgf·cm/cm², it will not be fully serviceable to a plastic sash or the like in cold climates.

The deformed extrusion mentioned above preferably has a tensile strength value of not less than 400 kgf/cm². If the tensile strength value is less than 400 kgf/cm² such troubles as deformation may take place in applications in hot climates.

The contour extrude mentioned above is another embodiment of the invention.

Having the above characteristic parameter values, the rigid vinyl chloride resin molded product according to the fourth aspect of the invention can be used with advantage in applications where extremely high impact strength and tensile strength values are required and even in applications, such as plastic sashes, where not only high impact and tensile strength values but also good appearance and moldability are required.

The seventh aspect of the present invention is concerned with a pipe of the vinyl chloride resin according to the first or second aspect of the invention, which has a Charpy impact strength value of not less than 100 kgf·cm/cm² and a tensile strength value of not less than 460 kgf/cm².

The pipe according to the seventh aspect of the invention comprises the vinyl chloride resin according to the first or second aspect of the invention and has the above-mentioned characteristic parameter values so that it can be used with advantage as town water and sewage pipes, plant drain pipes and so on.

The eighth aspect of the present invention is concerned with a contour extrude of the vinyl chloride resin according to the first or second aspect of the invention, which has a Charpy impact strength value of not less than 10 kgf·cm/cm² and a tensile strength value of not less than 400 kgf/cm².

Since the deformed extrusion according to the eighth aspect of the invention is made of the vinyl chloride resin according to said first or second aspect of the invention, it can be used with advantage in applications calling for not only high impact and tensile strength values but also good appearance and moldability, such as plastic sashes and sound barriers.

The ninth aspect of the invention is concerned with a plastic sash comprising the rigid vinyl chloride resin molded product according to the sixth aspect of the invention or the deformed extrusion according to the eighth aspect of the invention.

The plastic sash according to the ninth aspect of the invention is obtainable by assembling said deformed extrusion in the routine manner, and since it is quite acceptable in appearance, impact resistance and tensile strength, this sash can be used with great advantage as the sash to be affixed to a dwelling house or other building.

The plastic sash according to the ninth aspect of the invention is now described in detail, reference being had to the accompanying drawings.

FIG. 1 is a view showing an exemplary profile of the deformed extrusion used for fabricating the plastic sash according to the ninth aspect of the invention. In FIG. 1, the arrowmark indicates the direction of extrusion. Since the resin used here is the vinyl chloride resin according to the first aspect of the invention, it can be molded continuously without sticking to the extruder metal mold and the surface appearance of the resulting molding is satisfiable.

Figure 2:
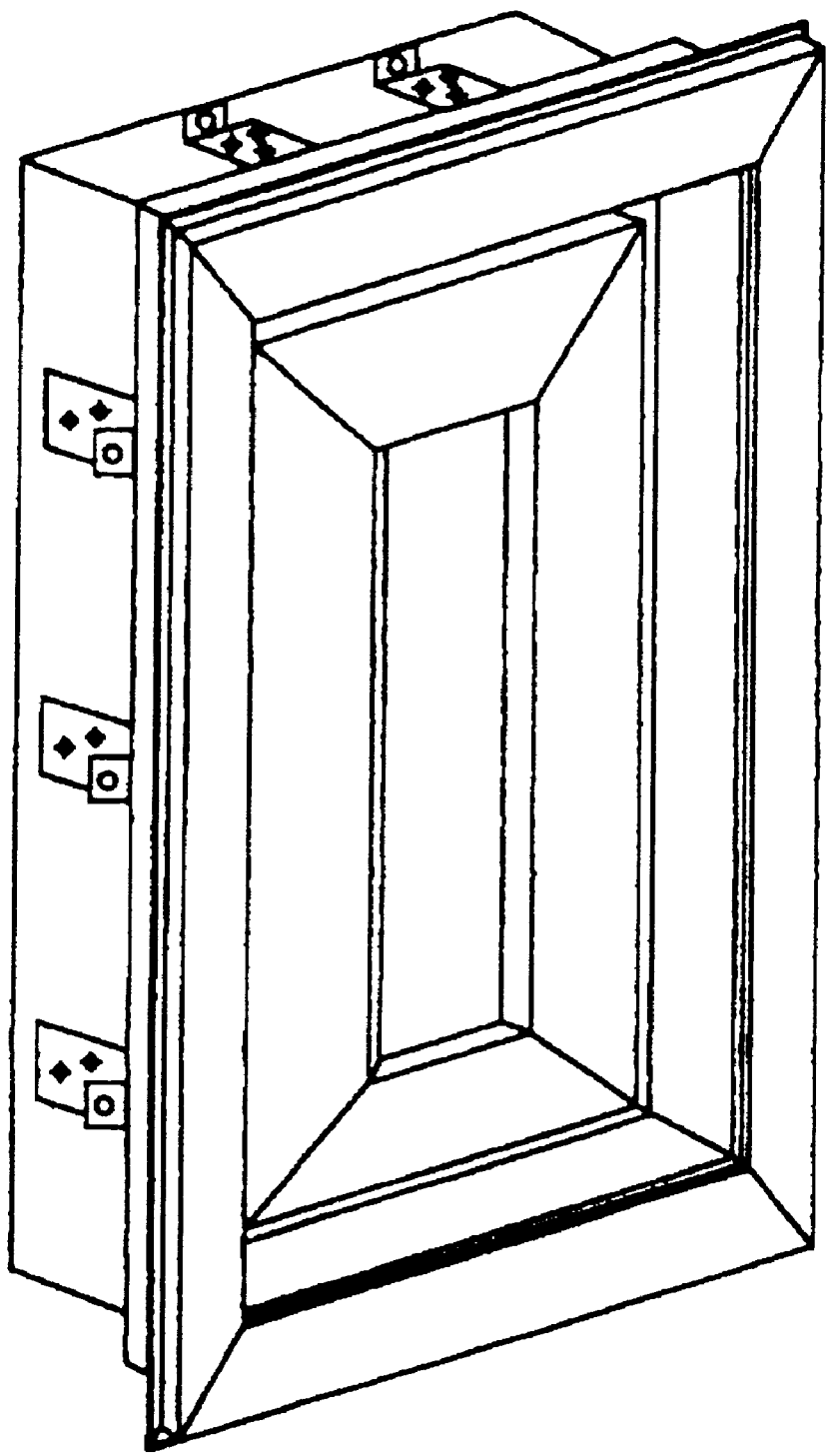
FIG. 2 is a perspective view showing a plastic sash according to the present invention.

The deformed extrusion illustrated in FIG. 1 is appropriately cut and assembled into the plastic sash illustrated in FIG. 2.

BEST MODE FOR CARRYING OUT THE INVENTION

The following examples illustrate the present invention in further detail without defining the scope of the invention.

Examples 1 to 6, Comparative Examples 1 to 7
Preparation of Acrylic Copolymer Latices According to the formulas shown in Tables 1 and 2, various vinyl chloride resins were prepared in conformity with the following production protocol.

First, predetermined amounts of deionized water, an emulsifier-dispersant (polyoxyethylene nonyl phenyl ether ammonium sulfate), a core monomer, and a polyfunctional monomer [trimethylolpropane triacrylate (TMPTA)] for polymerization were admixed under stirring to prepare a core emulsion monomer. Separately, predetermined amounts of deionized water, an emulsifier-dispersant (polyoxyethylene nonylphenyl ether ammonium sulfate), a shell monomer and TMPTA were admixed under stirring to prepare a shell emulsion monomer. Meanwhile, an autoclave was charged with a predetermined amount of deionized water and the stirring was commenced. The autoclave was decompressed to drive out oxygen and, then, nitrogen gas was introduced for reinstating the internal pressure. The temperature of the autoclave was then increased to 70° C. The autoclave thus preheated was charged with ammonium persulfate (APS) and, as a seed monomer, said core emulsion monomer in an amount corresponding to 20 weight % of the total core emulsion monomer at one time to start polymerization. Then, the remainder of the core emulsion monomer was added dropwise. This was followed by dropwise addition of said shell emulsion monomer and the addition of the whole emulsion monomer was completed in 3 hours. After 1 hour of ripening, the polymerization was terminated to give an acrylic polymer latex having a non-volatile fraction of about 30 weight %.

Preparation of Vinyl Chloride Resins

A reactor equipped with stirrer and jacket was charged with pure water, the acrylic polymer latex prepared as above, 3% aqueous solution of partially saponified polyvinyl acetate, t-butyl peroxyneodecanoate and α-cumyl peroxyneodecanoate all at one time. Then, the reactor was evacuated with a vacuum pump and further charged with vinyl chloride under stirring. Then, the polymerization was started at a polymerization temperature of 57° C. under jacket temperature control.

When the internal pressure had dropped to 6.0 kg/cm², the reaction was considered to have gone to completion and was, therefore, stopped by cooling. The unreacted vinyl chloride monomer was then removed, followed by dehydration and drying to give a vinyl chloride resin, the degree of polymerization of vinyl chloride therein being about 1000.

Example 7

Except that an acrylic copolymer was prepared by charging the reactor with the emulsion monomer in an amount corresponding to 30 weight % of the total amount as a seed monomer at one time, a vinyl chloride resin was prepared according to the formula shown in Table 1 in otherwise the same manner as in Example 1.

Example 8

Except that an acrylic copolymer was prepared by charging the reactor with the emulsion monomer in an amount corresponding to 10 weight % of the total amount as a seed monomer at one time, a vinyl chloride resin was prepared according to the formula shown in Table 1 in otherwise the same manner as in Example 1.

Comparative Example 8

Except that an acrylic copolymer was prepared by charging the reactor with the emulsion monomer in an amount corresponding to 50 weight % of the total amount as a seed monomer at one time, a vinyl chloride resin was prepared according to the formula shown in Table 1 in otherwise the same manner as in Example 1.

Comparative Example 9

Except that an acrylic copolymer was prepared by charging the reactor with the emulsion monomer in an amount corresponding to 3 weight % of the total amount as a seed monomer at one time, a vinyl chloride resin was prepared according to the formula shown in Table 1 in otherwise the same manner as in Example 1.

Comparative Example 10

Using 94 weight parts of vinyl chloride resin with a polymerization degree of 1000 and 6 weight parts of the acrylic copolymer prepared in Example 1, a mixture was prepared.

Comparative Example 11

Using 95 weight parts of vinyl chloride resin with a polymerization degree of 1000 and 5 weight parts of the acrylic copolymer prepared in Example 1, a mixture was prepared.

Measurement of the Mean Particle Diameter of Acrylic Copolymer

The mean particle diameter of the acrylic copolymer latex as the intermediate of vinyl chloride resin was measured using a laser diffraction/scattering particle distribution analyzer (manufactured by Horiba, Ltd.). The particle diameter of the acrylic copolymer in the vinyl chloride resin or a molded product thereof was measured on a TEM (transmission electron microscopy) picture. Thus, the vinyl chloride resin or a molded product thereof was stained with ruthenium oxide and thin sections prepared with an ultramicrotome were observed by TEM. On a ×10000 TEM photograph, the diameters of stained acrylic copolymer particles were measured and the mean diameter of all the particles within a 10 cm square field was regarded as the mean particle size of the acrylic copolymer particle. When the acrylic copolymer particle had been deformed into an elliptical or the like shape by the strain in molding, for instance, the average of its major and minor diameters was regarded as the particle diameter.

Measurement of Glass Transition Temperature

Tg was measured with a differential scanning calorimeter (DSC) (manufactured by Seiko Electronics). As the sample, a dried film of acrylic copolymer latex weighing about 10 mg was used [in the case of a molded product, a 20 g portion of the molded product was immersed in 200 ml of tetrahydrofuran (THF) for 50 hours and the THF-insoluble fraction was trapped with a 200-mesh sieve and dried in a film form]. The measuring range was −100 to 250° C. and the scanning speed was 5° C./min.

Assessment of Gel Fraction

From the dry film of acrylic copolymer [in the case of a molded product, a 20 g portion of the molded product was immersed in 200 ml of THF for 50 hours and the THF-insoluble fraction was trapped with a 200-mesh sieve and dried in a film form], about 1 g (W1g) was weighed out and allowed to sit in 50 ml of THF for 50 hours. The acrylic copolymer gel was separated from the THF solution with a 100-mesh metal sieve and dried at 70° C. for one day. The resulting dry gel was weighed (W2g) and the gel fraction was calculated by means of the following equation.

$$\text{Gel fraction (\%)} = (W2/W1) \times 100$$

Assessment of Graft Rate

About 10 g of vinyl chloride resin was weighed out (W3g) and stirred in 100 ml of THF for 50 hours. The THF-insoluble fraction was separated from the THF solution with a 200-mesh metal sieve and dried at 70° C. for 1 day. The resulting dry product was weighed (W4g) and the chlorine content was determined (C %). The graft ratio was then calculated by means of the following equation.

$$\text{Graft ratio (\%)} = [(C \times W4/56.8) \times 100]/[W3 - W4 \times (1 - C/56.8)]$$

Fabrication of Pipes

To 100 weight parts each of the vinyl chloride resins obtained in Examples 1~8 and Comparative Examples 1~10, 0.8 weight part of organotin stabilizer, 0.5 weight part of polyethylene lubricant, 0.2 weight part of stearic acid and 0.5 weight part of calcium stearate were added, and the whole mixture was stirred with Super Mixer (100 L, Kawata) to give a vinyl chloride resin composition. This vinyl chloride resin composition was fed to a twin-screw differential-direction extruder with a screw diameter of 50 mm (BT-50, manufactured by Plastic Engineering Institute) continuously to manufacture a 20 mm (dia.) vinyl chloride resin piping for 24 consecutive hours. The rigid polyvinyl chloride pipe thus obtained was evaluated for appearance and tested for impact resistance and tensile strength.

Appearance Evaluation of pipes

The internal and external wall surfaces of the rigid vinyl chloride pipe obtained as above were visually examined and the time from the start of molding to the onset of appearance defects such as thin spots, streaks and irregularities was determined. The production run in which the pipe consistently showed a satisfactory surface condition was recorded as 24≦. The results are shown in Tables 1 and 2.

Measurement of Impact Resistance

Charpy impact test was carried out in accordance with JIS K 7111. The testpiece was prepared from a sample at 30 minutes after the start of molding. The measuring temperature was 23° C. The results are shown in Tables 1 and 2.

Measurement of Tensile Strength

The test for tensile strength was carried out in accordance with JIS K 7113. The testpiece was prepared from a sample at 30 minutes after the start of molding. The measuring temperature was 23° C. The results are shown in Tables 1 and 2.

Fabrication of Deformed Extrusions

To 80 weight parts each of the vinyl chloride resins according to Examples 1 to 8, Comparative Examples 1 to 9 and Comparative Example 11, 20 weight parts of polyvinyl chloride with a polymerization degree of 1000, 3.0 weight parts of basic lead phosphate, 0.6 weight part of lead stearate, 0.3 weight part of calcium stearate, 0.5 weight part of stearic ester, 0.3 weight part of stearic acid, 5.0 weight parts of calcium carbonate and 3.0 weight parts of titanium dioxide were added and stirred with Super Mixer to give a vinyl chloride resin composition. This vinyl chloride resin composition was fed to a twin-screw differential-direction extruder with a screw diameter of 50 mm (BT-50, manufactured by Plastic Engineering Institute) continuously to manufacture the profile illustrated in FIG. 1 for 24 hours. For the vinyl chloride resin according to Example 1, the profiles obtained were assembled to give the plastic sash illustrated in FIG. 2.

The profiles obtained were evaluated for appearance and, as in the case of rigid vinyl chloride pipes, tested for impact resistance and tensile strength. The results are shown in Tables 1 and 2.

Appearance Evaluation of Profiles of Deformed Extrusions

The surfaces of the profiles of deformed extrusions obtained were visually inspected and the time from the start of molding to the onset of appearance defects such as thin spots, streaks and end cracks was determined. The production run in which the profile retained a satisfactory surface condition throughout a 24-hour period was recorded as $24 \leq$.

TABLE 1

| | | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Resin formula | Acrylic copolymer | Core monomer | 2-EHA (wt. %) | 69.85 | 69.5 | 69.85 | 69.85 | 49.9 | 79.85 | 69.85 | 69.85 |
| | | | TMPTA (wt. %) | 0.15 | 0.5 | 0.15 | 0.15 | 0.1 | 0.15 | 0.15 | 0.15 |
| | | Shell monomer | n-BA (wt. %) | 28.5 | 28.5 | 29.0 | 28.0 | 48.0 | — | 28.5 | 28.5 |
| | | | EA (wt. %) | — | — | — | — | — | 9.0 | — | — |
| | | | MMA (wt. %) | — | — | — | — | — | 10.0 | — | — |
| | | | TMPTA (wt. %) | 1.5 | 1.5 | 1.0 | 2.0 | 2.0 | 1.0 | 1.5 | 1.5 |
| | | Latex mean particle dia. (nm) | | 121 | 120 | 121 | 125 | 120 | 124 | 88 | 182 |
| | | Gel fraction (%) | | 95 | 98 | 98 | 98 | 93 | 96 | 91 | 97 |
| | | Glass transition temperature (° C.) | | −42~ −39 | −39~ −37 | −40~ −37 | −38~ −35 | −32~ −30 | −45~ −42 | −42~ −39 | −42~ −39 |
| | Acrylic copolymer (wt. %) | | | 6.0 | 6.0 | 6.0 | 6.0 | 10.0 | 6.0 | 6.0 | 6.0 |
| | Vinyl chloride monomer (wt. %) | | | 94.0 | 94.0 | 94.0 | 94.0 | 90.0 | 94.0 | 94.0 | 94.0 |
| | Graft ratio (%) | | | 1.4 | 1.4 | 1.3 | 1.7 | 1.6 | 1.2 | 1.5 | 1.3 |
| Evaluation | Pipe | Charpy impact (kgf · cm/cm$^2$) | | 133 | 136 | 130 | 131 | 128 | 137 | 131 | 134 |
| | | Tensile strength (kgf/cm$^2$) | | 485 | 492 | 487 | 495 | 475 | 468 | 467 | 462 |
| | | Appearance (time to rejection: h) | | 24≦ | 24≦ | 24≦ | 24≦ | 24≦ | 24≦ | 24≦ | 24≦ |
| | Deformed extrusion | Charpy impact (kgf · cm/cm$^2$) | | 16 | 15 | 15 | 14 | 14 | 16 | 15 | 15 |
| | | Tensile strength (kgf/cm$^2$) | | 442 | 451 | 438 | 454 | 440 | 435 | 432 | 430 |
| | | Appearance (time to rejection: h) | | 24≦ | 24≦ | 24≦ | 24≦ | 24≦ | 24≦ | 24≦ | 24≦ |

TABLE 2

| | | | | Compar. Ex. 1 | Compar. Ex. 2 | Compar. Ex. 3 | Compar. Ex. 4 | Compar. Ex. 5 | Compar. Ex. 6 |
|---|---|---|---|---|---|---|---|---|---|
| Resin formula | Acrylic copolymer | Core monomer | 2-EHA (wt. %) | 70.0 | 68.0 | 69.85 | 69.85 | 29.9 | 94.8 |
| | | | TMPTA (wt. %) | — | 2.0 | 0.15 | 0.15 | 0.1 | 0.2 |
| | | Shell monomer | n-BA (wt. %) | 28.5 | 28.5 | 29.7 | 26.5 | 46.5 | — |
| | | | EA (wt. %) | — | — | — | — | 20 | — |
| | | | MMA (wt. %) | — | — | — | — | — | 4.8 |
| | | | TMPTA (wt. %) | 1.5 | 1.5 | 0.3 | 4.5 | 3.5 | 0.2 |
| | | Latex mean particle dia. (nm) | | 119 | 122 | 118 | 123 | 120 | 121 |
| | | Gel fraction (%) | | 35 | 98 | 45 | 98 | 96 | 42 |
| | | Glass transition temp. (° C.) | | −43~ −39 | −25~ −17 | −39~ −36 | −23~ −16 | −21~ −18 | −47~ −45 |
| | Acrylic copolymer (wt. %) | | | 6.0 | 6.0 | 6.0 | 6.0 | 10.0 | 6.0 |
| | Vinyl chloride monomer (wt. %) | | | 94.0 | 94.0 | 94.0 | 94.0 | 90.0 | 94.0 |
| | Graft ratio (%) | | | 1.3 | 1.4 | 0.6 | 1.7 | 1.6 | 0.8 |
| Evaluation Deformed extrusion | Pipe | Charpy impact (kgf · cm/cm$^2$) | | 24 | 23 | 128 | 22 | 15 | 144 |
| | | Tensile strength (kgf/cm$^2$) | | 454 | 485 | 463 | 496 | 502 | 445 |
| | | Appearance (Time to rejection: h) (Defect) | | 8 Streaks | 24≦ | 15 Thin spots | 24≦ | 24≦ | 3 Streaks |
| | Deformed extrusion | Charpy impact (kgf · cm/cm$^2$) | | 6 | 8 | 14 | 8 | 6 | 17 |
| | | Tensile strength (kgf/cm$^2$) | | 422 | 455 | 442 | 459 | 458 | 401 |
| | | Apperance (Time to rejection: h) (Defect) | | 11 Streaks | 24≦ | 10 Streaks | 24≦ | 24≦ | 1 Cracks |

TABLE 2-continued

|  |  |  |  | Compar. Ex. 7 | Compar. Ex. 8 | Compar. Ex. 9 | Compar. Ex. 10 | Compar. Ex. 11 |
|---|---|---|---|---|---|---|---|---|
| Resin formula | Acrylic copolymer | Core monomer | 2-EHA (wt. %) | 99.7 | 69.85 | 69.85 | 69.85 | 69.85 |
|  |  |  | TMPTA (wt. %) | 0.3 | 0.15 | 0.15 | 0.15 | 0.15 |
|  |  | Shell monomer | n-BA (wt. %) | — | 28.5 | 28.5 | 28.5 | 28.5 |
|  |  |  | EA (wt. %) | — | — | — | — | — |
|  |  |  | MMA (wt. %) | — | — | — | — | — |
|  |  |  | TMPTA (wt. %) | — | 1.5 | 1.5 | 1.5 | 1.5 |
|  |  | Latex mean particle dia. (nm) |  | 122 | 52 | 320 | 121 | 121 |
|  |  | Gel fraction (%) |  | 38 | 62 | 97 | 95 | 95 |
|  |  | Glass transition temp. (° C.) |  | −48~ −46 | −41~ −38 | −40~ −37 | −42~ −39 | −42~ −39 |
|  | Acrylic copolymer (wt. %) |  |  | 6.0 | 6.0 | 6.0 | — | — |
|  | Vinyl chloride monomer (wt. %) |  |  | 94.0 | 94.0 | 94.0 | — | — |
|  | Graft ratio (%) |  |  | 0.5 | 1.5 | 1.2 | 0 | 0 |
| Evaluation | Pipe | Charpy impact (kgf · cm/cm²) |  | 143 | 90 | 87 | 112 | — |
|  |  | Tensile strength (kgf/cm²) |  | 421 | 461 | 447 | 460 | — |
|  |  | Appearance (Time to rejection: h) (Defect) |  | 3 Streaks | 15 Thin spots | 24≦ | 2 Thin spots | — |
| Deformed extrusion | Deformed extrusion | Charpy impact (kgf · cm/cm²) |  | 18 | 11 | 12 | — | 10 |
|  |  | Tensile strength (kgf/cm²) |  | 377 | 442 | 397 | — | 436 |
|  |  | Apperance (Time to rejection: h) (Defect) |  | 1 Cracks | 24≦ | 24≦ | — | 1 Streaks |

In Table 1, 2-EHA stands for 2-ethylhexyl acrylate, n-BA for n-butyl acrylate, EA for ethyl acrylate, MMA for methyl methacrylate, and TMPTA for trimethylolpropane triacrylate.

INDUSTRIAL APPLICABILITY

The vinyl chloride resin of the invention, described above, has an extremely high impact resistance and, when formulated with additives used for the conventional molding, can be molded with good fluidity and provide molded products of good surface condition persistently over many hours of continuous molding. Particularly, the resin is suited to the continuous production of deformed extrusions having a satisfactory appearance.

By taking advantage of the above characteristics, the vinyl chloride resin of the invention can be used with success in the field of rigid vinyl chloride pipes which require a high impact resistance, plastic sashes or sound barriers comprising deformed extrusions requiring satisfactory moldability and surface quality and so on.

Molded products obtainable from the vinyl chloride resin of the invention are so outstanding in tensile strength and impact resistance that they are suitable for use in the field of rigid products.

What is claimed is:

1. A vinyl chloride resin as obtained by graft-copolymerizing an acrylic copolymer (a) with a vinyl monomer (b) predominantly composed of vinyl chloride and comprising a matrix resin predominantly composed of polyvinyl chloride and, as dispersed therein, a particle of said acrylic copolymer (a),
the graft ratio of vinyl chloride to said acrylic copolymer (a) being 0.1 to 5 weight %,
said acrylic copolymer (a) having a glass transition point of not lower than −45° C. but lower than −30° C., a gel fraction of 50 to 100 weight % and a mean particle diameter of 60 to 250 nm and being obtained by graft-copolymerizing 40 to 90 weight % of a copolymer (a–1) with 10 to 60 weight % of a mixture monomer (a–2),
said copolymer (a–1) being composed of 100 weight parts of a radical-polymerizable monomer which gives a homopolymer having a glass transition point of not lower than −140° C. but lower than −60° C. and 0.1 to 1 weight part of a polyfunctional monomer,
and said mixture monomer (a–2) comprising 100 weight parts of a radical-polymerizable monomer predominantly comprised of a (meth)acrylate which gives a homopolymer having a glass transition point of not lower than −55° C. but lower than −10° C. and 1.5 to 10 weight parts of a polyfunctional monomer.

2. A method of producing a vinyl chloride resin comprising
reacting 100 weight parts of a radical-polymerizable monomer with 0.1 to 1 weight part of a polyfunctional monomer to give a copolymer (a–1), where the radical-polymerizable monomer gives a homopolymer having a glass transition point of not lower than −140° C. but lower than −60° C.,
graft-copolymerizing 40 to 90 weight % of said copolymer (a–1) with 10 to 60 weight % of a mixture monomer (a–2) to give an acrylic copolymer (a), where the acrylic copolymer (a) has a glass transition point of not lower than −45° C. but lower than −30° C., a gel fraction of 50 to 100 weight % and a mean particle diameter of 60 to 250 nm and the mixture monomer (a–2) comprises 100 weight parts of a radical-polymerizable monomer predominantly comprised of a (meth)acrylate which gives a homopolymer having a glass transition point of not lower than −55° C. but lower than −10° C. and 1.5 to 10 weight parts of a polyfunctional monomer, and graft-copolymerizing said acrylic copolymer (a) with a vinyl monomer (b) predominantly comprised of vinyl chloride, wherein the graft ratio of vinyl chloride to said acrylic copolymer (a) is 0.1 to 5 weight %.

3. A rigid vinyl chloride resin molded product as obtained by graft-copolymerizing an acrylic copolymer (a) with a vinyl monomer (b) predominantly composed of vinyl chloride and comprising a matrix resin predominantly composed of polyvinyl chloride and, as dispersed therein, a particle of said acrylic copolymer (a), the graft ratio of vinyl chloride to said acrylic copolymer (a) being 0.1 to 5 weight %, said acrylic copolymer (a) having a glass transition point of not lower than −45° but lower than −30° C., a gel fraction of 50 to 100 weight % and a mean particle diameter of 60 to 250 nm and being obtained by graft-copolymerizing 40 to 90 weight % of a copolymer (a−1) with 10 to 60 weight % of a mixture monomer (a−2), said copolymer (a−1) being composed of 100 weight parts of a radical-polymerizable monomer which gives a homopolymer having a glass transition point of not lower than −140° but lower than −60° C. and 0.1 to 1 weight part of a polyfunctional monomer, and said mixture monomer (a−2) comprising 100 weight parts of a radical-polymerizable monomer predominantly comprised of (meth)acrylate which gives a homopolymer having a glass transition point of not lower than −55° C. but lower than −10° C. and 1.5 to 10 weight parts of a polyfunctional monomer.

4. The rigid vinyl chloride resin molded product according to claim 3 which is a pipe having a Charpy impact strength value of not less than 100 kgf·cm$^2$ and a tensile strength value of not less than 460 kgf/cm$^2$.

5. The rigid vinyl chloride resin molded product according to claim 3 which is a deformed extrusion having a Charpy impact strength value of not less than 10 kgf·cm/cm$^2$ and a tensile strength value of not less than 400 kgf/cm$^2$.

6. A pipe of the vinyl chloride resin according to claim 1, which has a Charpy impact strength value of not less than 100 kgf·cm/cm$^2$ and a tensile strength value of not less than 460 kgf/cm$^2$.

7. A deformed extrusion of the vinyl chloride resin according to claim 1, which has a Charpy impact strength value of not less than 10 kgf·cm/cm$^2$ and a tensile strength value of not less than 400 kgf/cm$^2$.

8. A plastic sash comprising the rigid vinyl chloride resin molded product according to claim 5.

9. A plastic sash comprising the deformed extrusion according to claim 7.

* * * * *